United States Patent [19]
Sanders

[11] 3,754,252
[45] Aug. 21, 1973

[54] ADAPTIVE ARRAY RETRODIRECTIVE LANDING CONTROL RESPONSER

[75] Inventor: Lon L. Sanders, Canoga Park, Calif.

[73] Assignee: International Telephone and Telegraph Corporation, New York, N.Y.

[22] Filed: Oct. 6, 1971

[21] Appl. No.: 186,898

[52] U.S. Cl................ 343/6.5, 343/5 LS, 343/16, 343/100 TD
[51] Int. Cl.......... G01s 9/56, G01s 9/02, H04b 7/00
[58] Field of Search.............. 343/6.5 R, 6.5 LC, 343/16 R, 100 SA, 854, 7.3, 106 R, 100 TD, 5 LS

[56] References Cited
UNITED STATES PATENTS

| | | | |
|---|---|---|---|
| 3,699,571 | 10/1972 | Sanders | 343/6.5 R |
| 3,680,089 | 7/1972 | Sanders | 343/6.5 R |
| 3,648,285 | 3/1972 | Sanders | 343/6.5 R |
| 3,684,962 | 8/1972 | Hottel, Jr. | 343/6.5 R X |
| 3,500,406 | 3/1970 | Parker | 343/6.5 R |
| 3,394,374 | 7/1968 | Weiss | 343/100 TD |

Primary Examiner—Benjamin A. Borchelt
Assistant Examiner—A. M. Psitos
Attorney—C. Cornell Remsen, Jr.

[57] ABSTRACT

A landing control system normally quiescent but responsive to pulsed interrogation from an aircraft to be given (typically) elevation and azimuth angle information for landing approach. The ground responser equipment determines the angle of arrival of the interrogation pulses through an adaptive phased array arrangement and retransmits that information as a coded reply. Range information is air derived through the measurement of time delay in receiving the coded responser reply corresponding to each interrogation.

10 Claims, 1 Drawing Figure

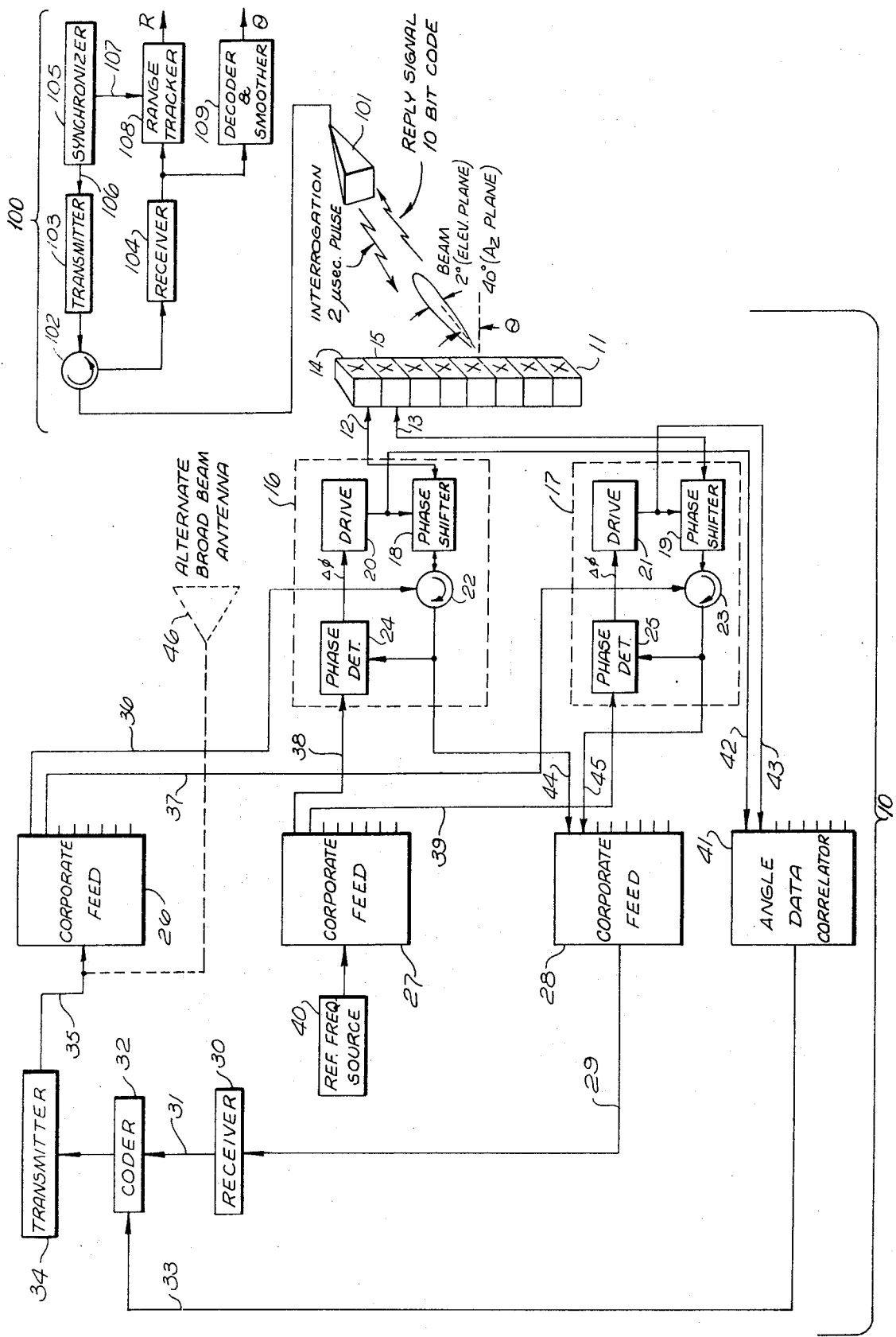

ADAPTIVE ARRAY RETRODIRECTIVE LANDING CONTROL RESPONSER

BACKGROUND OF THE INVENTION

1. Field of the Invention

The invention relates to air navigation systems in general and more particularly, to systems adapted to provide guidance for aircraft (including VTOL) approach and landing.

2. Description of the Prior Art

In the prior art there have been many developments for providing navigational guidance to aircraft. Such systems have been produced for long-range (enroute) navigation (LORAN, Omni-range, Radar in various forms, etc.), as well as for the relatively more critical problem of providing navigational assistance under low visibility instrument conditions at the time of landing. The urgency of the landing situation has long been recognized as a problem of very high priority, since it critically affects safety and continuity of operation in civil and military aviation.

Existing systems for landing includes ILS, GCA, Automatic GCA, and various other active ground and airborne radar systems. A comprehensive reference for reader background which describes most of the widely known prior art navigational aids for aviation is the textbook "Electronic Avigation Engineering" by P. C. Sandretto, published in 1958 by International Telephone and Telegraph Corporation, New York, N.Y.

One embodiment of the so-called GCA system is described in U.S. Pat. No. 2,975,413 and in its automatic track-while-scan form is typically covered in U.S. Pat. No. 2,980,902.

Various ways have been proposed for using scanning radar for specialized landing assist, however, the relative complication and operating personnel requirements can be seriously disadvantageous in the case of the remote or newly established landing area for aircraft of the VTOL classes. Landing aids for VTOL aircraft in all-weather conditions are of special interest in certain military situations, and are attracting increasing interest in other situations.

In the particular type of device with which the present invention is concerned, a few specific applications are as follows:

a. A landing aid for VTOL fight/bomber aircraft for use at remote dispersal airfields or parking pads.

b. A landing aid for assault helicopter operations in remote areas previously accessible only by parachute.

c. A landing aid for civil helicopter and VTOL airways operations for use in urban areas.

d. A landing aid for forward area Army airfields or cargo delivery air strips.

e. A landing aid which augments an ILS system or a GCA system at larger well-improved airports.

The above areas of need represent situations where there is a high premium on all-weather operations and a large number of potential user aircrafts. Most of the above requirements are not effectively satisfied by the existing ILS, GCA or similar systems by themselves.

Perhaps more particularly pertinent as background for the present invention is the art relating to scanning-beam landing systems. These include several well-known systems such as the so-called MADGE (Mullard Electric, Ltd. of Great Britain) and ORTAC (Standard Electric Lorenz of Germany) systems.

Other currently new approaches to the general problem are described in copending U. S. Pat. applications, Ser. No. 23,869, filed Mar. 30, 1970, entitled "Aircraft Electronic Landing Responser System Using Airborne Chirp Interrogation," now U.S. Pat. No. 3,680,089 and Ser. No. 23,757, filed Mar. 30, 1970, entitled "Aircraft Electronic Landing Responser System Using Scanning Pencil Beam Ground Antenna," now U.S. Pat. No. 3,648,285 and also in Ser. No. 93,731 filed Nov. 30, 1970, entitled "Instrument Landing System Using A Retrodirective Sletten Antenna Responser", now U.S. Pat. No. 3,699,571. Those applications are assigned to the assignee of this instant case. Those systems, while having their own advantages, do not afford the very low repetition rate operation possible with the present invention (resulting in low power operation without sacrifice of accuracy).

The manner in which a typical embodiment of the present invention is constructed and operated to achieve the advantages and solve the aforementioned problems will be apparent as this description proceeds.

SUMMARY

The representative embodiment of the invention herein described is based on the use of so-called processing array techniques. The array consists of a plurality of elements extending as a linear phased array producing a relatively narrow beam in the plane in which the angular measurement is to be achieved. The feed phase is separately and independently controlled for each element of the said array through the use of a corresponding plurality of phase shifting servoloops. These individual phase shift servos operate to drive corresponding antenna phase shifters until the received signal at that particular element plus the introduced shift is in phase with a reference signal. In this way the antenna rapidly forms an antenna beam in the direction of received signals. The illustrated embodiment performs this individual antenna element phase adjustment at radio frequency, although once the system is thoroughly understood, it will be realized that it could also be implemented in the IF domain. The outputs from all of these individual element phase shifters are added coherently in a feed assembly and then supplied to the receiver. The angle of the arrival of the signal is derived in an angle data computer which examines the values sent into each of the phase shifters. This computer performs the inverse function of a beam steering computer. An equivalent or implicit angle representing signal thus derived is used to encode a reply signal which is transmitted through the same set of phase shifter values and the same antenna array to an interrogating airborne unit. The said airborne unit comprises duplexing means and a very low interrogating pulse repetition frequency so that its "listening" time is comparatively long. Range information is derived from a range tracker which measures the delay from transmission of an interrogating pulse to the time of receipt of a corresponding reply. Angle representing signals (typically elevation angle) are obtained in indicating form by decoding and smoothing the said reply codes. Herein, for convenience, the ground responser is sometimes referred to as a first station, whereas the airborne unit is referred to as the second station.

It will be noted that the said second station receives a full accuracy reply code for every interrogation. The adaptive array responsers system herein described would normally have electronically controlled (non inertial) circuitry for performing the individual array element phase shift adjustment task, and therefore could be expected to respond very rapidly. Thus, the adaptive array responser system has the capability of operating at very low interrogation pulse repetition frequencies and consequently an absolute minimum of primary power is required. Typical practical airborne unit pulse repetition rates for interrogation may be as low as 25 cycles per second with an adequate number of data samples in reply being provided to insure good smoothing. In addition to the very low power consuming characteristic of the first or ground station, it will also been seen to be normally quiescent in that it only replies when interrogated and then only substantially in the direction from the interrogation was received. A more detailed understanding of the instrumentation described and illustrated will be achieved through study of the hereinafter detailed description.

BRIEF DESCRIPTION OF THE DRAWING

A single drawing FIGURE is provided showing the structural and functional elements of the present invention in schematic block form.

DESCRIPTION OF THE PREFERRED EMBODIMENT

Referring now to the drawing, the first station (ground) components are generally shown at 10 and the airborne or second station components are shown generally at 100. A linear array for forming a beam relatively narrow (2°) in the elevation plane is shown generally at 11. Although the radiating elements themselves are depicted as being of the cross-slot type, typically 14 and 15, it will be understood that this is a matter of convenience only. Dipole or other individual radiators consistent with polarization and other needs could be arranged for the same purpose. Feed lines 12 and 13 apply discretely to the radiators 14 and 15 and, of course, other feed lines not illustrated, would connect individually to the remaining radiating elements. In order to minimize the complication of the drawing, the structure illustrated has been limited to that corresponding to these two radiating elements 14 and 15, it being obvious how the remaining six radiating elements of the array 11 would be provided for by duplication of the circuit blocks 16 and 17 with appropriate connections to 11 and the corporate feeds 26, 27 and 28.

Arrays of the type illustrated at 11 are sometimes referred to as "processing arrays" when they are associated with phase control means for each individual element. Certain beam positioning radars make use of programmed control of phase shifters associated with each radiating element and thereby achieve predetermined beam pointing and radiation pattern effects. Since a combination of individual radiation element feed phases can be undertaken to provide those effects, it also follows that energy received by the array assumes a particular or discrete phase distribution pattern among the radiating elements. In the present invention, a stable reference frequency source 40 operates at the frequency of the airborne transmitter 103 and provides a stable phase reference for comparison against individual radiating element received energy phase. For each array element, the said comparison is effected discretely, for example, array element 14 is compared to the reference 40 in phase detector 24 and array element 15 is compared to 40 in phase detector 25. During receiving at the first station, the duplexers (circulators) 22 and 23 permit received energy from the array 11 to pass through the respective phase shifters 18 and 19 to the aforementioned phase detectors.

The blocks 16 and 17 may be said to comprise the individual servo subsystems for each of the corresponding antenna elements. During the phase comparison a $\Delta \phi$ signal, which is the phase error, passes from each phase detector to a corresponding phase shifter drive device, as at 20, corresponding to phase detector 24. The same applies to drive device 21 corresponding to phase detector 25. The outputs of these drive units operate the respective phase shifters 18 and 19 directly.

At this point, it is useful to consider the individual phase shifter settings automatically assumed in the aforementioned process during interrogation (receiving at station 1). If a selected element in the middle of the array is considered as being adjusted to some arbitrary phase shift $\phi$, then the adjacent elements on each side thereof would be adjusted to $\phi (1-K_1)$ and $\phi (1+K_1)$. The next array elements outward would have phase shifter settings of $\phi (1-K_2)$ and $\phi (1+K_2)$, etc.

From the foregoing discussion of phase shifter settings corresponding to an arbitrary beam angle $\theta$ at the array 11, it will be realized that the drive signals as present on 42 and 43 will have corresponding (proportional) values, assuming that the phase shifters themselves are substantially identical or more specifically that they produce the same phase shift values in the RF circuit for the same drive signals, whether these drive signals be analog values or digital values.

At this point it will be realized that the controllable (latching) type phase shifters represented by 18 and 19 may be any one of a number of different type devices. The book entitled "Radar Handbook," Merrill I. Skolnik, editor-in-chief, a McGraw-Hill book (1970) contains extensive information in its Chapter 12, in review of the state of the art in respect to such phase shifters. Among the types suitable for the instrumentation of the blocks 18 and 19 are the ferrite and semi-conductor diode types. If the phase shifters are of the digital type, the corresponding drive devices 20 and 21 will necessarily contain analog-to-digital conversion circuitry to convert the $\Delta \phi$ phase detector output signals into digital values. If the said phase shifters are of the analog control type, however, the entire operation within the blocks 16 and 17 would be of an analog nature, and the signals on 42 and 43 would be analog in nature. It will be noted that all of the said phase shift drive signals 42 and 43 whether analog or digital in nature are supplied to an angle gated correlator unit 41. This device 41 is essentially the reverse of a beam angle pointing control computer in prior art systems where the objective is the programmed pointing of a beam from an array such as 11 using phase shifters similar to 18 and 19. In such prior art systems, an input signal which commands a certain beam pointing angle is converted into discrete phase shifter commands appropriate for each of the independent radiating elements of the array to form the desired beam. The correlator 41 performs essentially the inverse function in that it accepts all of the phase shifter commands as at 42 and 43 and produces a digital or analog value on the lead 33 which is descriptive of the beam angle $\phi$. For purposes of this description, it is well to remember that $\phi$ is, in this case, a vertical or elevation angle.

The so-called angle data correlator 41 can be instrumented in any of several ways. One rather obvious way, once the functional equipment is understood, is to use a prior art beam-angle control computer, as hereinbefore mentioned, in a circuit to generate the signal on 33 implicitly. That is, a controlled variation of the signal on 33 (within 41 but not admitted onto 33) would be allowed until the outputs are exactly matched to the set of phase shifter drive signals (as for example 42, 43 etc.). At that time, the control signal 33 is held at the corresponding value. This control signal 33 may be either digital or analog. If digital, the coder 33 merely acts as a switch passing the code on 33, in response to an enabling signal on 31 during the time that the corporate feed 28 is passing a received signal from the array 11 via lead 29 to the receiver 30. This enabling or keying signal 31 would be in the video realm.

If the phase shifters 18 and 19 are of the digital latching type, then the signals on 42 and 43 are digital codes and the angle data correlator 41 is merely a multi-channel digital-to-analog converter wherein each digital phase shifter signal provides a contribution to the analog signal output on 33. In that form of instrumentation the coder 32 actually generates a digital code representing the beam angle $\phi$. For a practical instrumentation of the present invention, a 10-bit code was considered appropriate. It will be readily seen that, from the coder 32 a transmitter 34 transmits the said code via lead 35 through corporate feed 26 and hence lines 36 and 37 etc., where it is introduced back into the array 11 through the corresponding circulators 22, 23 and the corresponding phase shifters 18 and 19. The said 18 and 19 are now latched in the appropriate position from the previous adjustment during interrogation signal reception from the second station. Accordingly, by reciprocity, the transmitted reply beam formed at the angle $\phi$ traverses the path back to airborne receiving antenna 101 along a section of the same path from which the previous interrogation pulse was received. The corporate feeds 26, 27 and 28 serve the purpose of distributing radio frequency signals throughout the instrumentation of the said first station in equal path length fashion. Thus, no differential phase shifts are introduced which would interfere with the accurate comparisons required to be made against the reference source 40. This is to say that receiver feed lines 44 and 45 would constitute equal path lengths, as would phase detector reference supply lines 38 and 39. Similarly, retransmission via 36 and 37 from the corporate feed 26, requires an equal path length situation here also in order that the reply code transmission beam angle should not vary appreciably from the interrogation beam angle. Since measurement is not directly involved in this later described situation however, the equal path length concept via the corporate feed 26 is not as important as it is in respect to 27. In fact, if an alternative broad beam antenna 46 were used to transmit the replies, corporate feed 26 and the various duplexer assemblies, such as 22 and 23, would not be required. The frequency of operation of transmitter 34 is independent of the frequency used in 103, however, unless the alternative antenna 46 is used, transmitter 34 must be operated in a frequency within the bandwidth of the first station components.

Other configurations in respect to the location of the duplexing function will suggest themselves to those skilled in the art, once the purpose and nature of the said first station instrumentation is thoroughly understood.

Referring now to the airborne or second station components generally illustrated at 100, the antenna 101 is shown as a horn type, but actually may be any other type of moderately directive antenna which will minimize the unnecessary scattering of interrogation energy while insuring that the ground antenna array 11 is illuminated by it over a fairly large range of elevation angles and aircraft attitude variations.

Interrogation from the airborne components is very simply generated in that a synchronizer 105 generates timing pulses at a selected pulse repetition frequency, which in the present instrumentation, may be as low as 25 cycles. Essentially a full and accurate reply is provided from the said first station in response to each interrogation pulse, and therefore data smoothing problems are minimal in the airborne instrumentation. The timing pulses or triggers on 106 operate the transmitter 103 as a straight-forward microwave transmitter with pulse modulator, providing typically a 2 microsecond pulse at the aforementioned pulse repetition frequency through the duplexer 102 to the airborne antenna 101. During reception the duplexer 102 channels the reply signal code to a receiver 104 and thereafter to a decoder and smoother 109 which is a well understood form of digital-to-analog converter providing an output representative or indicative of the angle $\phi$, the measured elevation angle of the airborne (second station) equipment with respect to the array 11 at said first station. A cross-pointer meter or other indicating device, which actually of itself forms no part of the present invention, can be provided to display the said analog $\theta$ signal output from 109.

A range tracker 108 similarly provides a range analog output based on a simple and well understood measurement of time delay between the synchronizer pulses 107 (essentially in time with those on 106) and the envelope of the received code from receiver 104.

In order to embrace an arbitary azimuth landing zone of 40°, the azimuth beam width of the array 11 would normally be on the order of 40°, whereas its vertical width is 2° or less in the plane or angular coordinate of measurement.

Although as aforesaid, the instrumentation described in detail was related to elevation angle determination, there is no reason why the said array 11 could not be rotated 90° in order to permit azimuth angle measurement over 40° of elevation variation. Similarly the system could be duplicated for measurement of both azimuth and elevation angles if desired, with precautions for discrete indentification of azimuth and elevation data. Such a measure could be, for example, a frequency separation between a transmitter 34 used for elevation and a corresponding one used for azimuth. Also, additional coding to identify a reply signal as applying to azimuth or elevation could be added to such a system.

Various other variations and modifications of the illustrated and described embodiment will obviously suggest themselves to those skilled in these arts. Accordingly, it is not intended that this description and the drawing should be regarded as limiting the scope of the invention, these being regarded as typical and illustrative only.

What is claimed is:

1. A radar responser system for determining, at a first station, at least a first angular coordinate of a second station and transmitting reply signals representative of said angular coordinate from said first station to said second station in response to interrogation pulses from said second station, comprising:
   an antenna array located at said first station for receiving said interrogation pulses, said array including a plurality of separately excited antenna elements arranged to form a beam narrow in said first angular coordinate;
   means for generating a phase comparison signal discretely for each of said antenna elements, as a function of the angle of reception at said array of said interrogation pulses;
   phase control means responsive to said phase comparison signal to control the feed phase of each of said antenna elements independently to form said beam at said first angular coordinate;
   and means responsive to said phase comparison signal for transmitting a reply signal from said first station to said second station, said reply signal being representative of said angle coordinate.

2. The invention set forth in claim 1 in which said phase control means includes a plurality of phase shifters each having a first terminal connected to a corresponding one of said antenna elements, and including a stable reference frequency source having a frequency fixed with respect to the frequency of said interrogation pulses, and in which said phase comparison means includes a phase detector connected to compare the phase of the output of said reference source with the phase of energy at the second terminal of each of said phase shifters to produce and apply a corresponding phase shifter control signal to control input of each phase shifter.

3. Apparatus according to claim 2 in which said first and second phase shifter terminals are defined as the radio frequency terminals thereof, and said phase shifter is of a reciprocal type.

4. Apparatus according to claim 3 including correlator means responsive to at least some of the plurality of said phase shifter control signals for generating a beam angle representing signal, and transmitter means for transmitting said beam angle representing signal in response to each interrogation pulse from said second station.

5. Apparatus according to claim 4 in which said second station comprises a source of radio frequency interrogation pulses, a second station antenna for transmitting said interrogation pulses, second station receiver means for decoding said reply signals from said first station to produce an angle indicating signal at said second station, and second station duplexing means interconnecting said second station antenna, said source of interrogation pulses and said second station receiver, whereby said second station receiver means is operative at times other than during transmission of said interrogation pulses.

6. Apparatus according to claim 5 in which said second station also includes range tracking means responsive to the output of said second station receiver and said source of interrogation pulses for determining range to said first station as a function of time elapsed between said interrogation pulses and corresponding reply signals from said first station.

7. Apparatus according to claim 4 in which said means for transmitting said beam angle representing signal at said first station includes receiving means responsive to said interrogation pulses received at said array for producing contemporaneous corresponding synchronizing pulses, and including a coder responsive to said synchronizing pulses and the output of said correlator means.

8. Apparatus according to claim 7 including a duplexer corresponding to each of said antenna elements, said duplexer interconnecting said phase shifter second terminal with said receiver and said phase detector during reception of said interrogating signals and interconnecting said phase shifter second terminal with said transmitter means during generation of said reply signals.

9. Apparatus according to claim 3 in which each of said phase shifters and its corresponding phase detector comprises a servo loop for adapting the value of phase shift in each of said phase shifters as a function of the angle of reception of said interrogating pulses and the position of the corresponding antenna element along said array.

10. Apparatus according to claim 8 in which said correlator means comprises a digital read only device which produces a digital code representative of said angular coordinate from stored values in response to input signals consisting of a said phase comparison signals, and said coder passed said digital code for transmission contemporaneously with occurrence of said synchronizing pulses.

* * * * *